United States Patent
Nomoto

(10) Patent No.: US 8,391,247 B2
(45) Date of Patent: Mar. 5, 2013

(54) BASE STATION DEVICE AND SIGNAL PROCESSING METHOD

(75) Inventor: Akihiro Nomoto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 755 days.

(21) Appl. No.: 12/294,856

(22) PCT Filed: Mar. 28, 2007

(86) PCT No.: PCT/JP2007/056620
§ 371 (c)(1),
(2), (4) Date: Dec. 9, 2009

(87) PCT Pub. No.: WO2007/119558
PCT Pub. Date: Oct. 25, 2007

(65) Prior Publication Data
US 2010/0085911 A1 Apr. 8, 2010

(30) Foreign Application Priority Data
Mar. 28, 2006 (JP) .................... 2006-087095

(51) Int. Cl.
*H04W 4/00* (2009.01)
(52) U.S. Cl. ........................................ 370/334
(58) Field of Classification Search ............ 370/334
See application file for complete search history.

(56) References Cited

U.S. PATENT DOCUMENTS

| | | | | |
|---|---|---|---|---|
| 5,339,184 A | * | 8/1994 | Tang ............................. | 398/116 |
| 5,621,786 A | * | 4/1997 | Fischer et al. ................ | 455/436 |
| 5,657,374 A | * | 8/1997 | Russell et al. ................ | 370/328 |
| 7,394,883 B2 | * | 7/2008 | Funakubo et al. ............ | 375/356 |
| 2004/0198451 A1 | * | 10/2004 | Varghese ................... | 455/562.1 |
| 2005/0208976 A1 | | 9/2005 | Funakubo et al. | |
| 2007/0153935 A1 | * | 7/2007 | Yang et al. ..................... | 375/267 |
| 2007/0197258 A1 | * | 8/2007 | Oda et al. .................. | 455/554.2 |

FOREIGN PATENT DOCUMENTS

| | | |
|---|---|---|
| JP | 04048832 A | 2/1992 |
| JP | 09083450 A | 3/1997 |
| JP | 11136735 A | 5/1999 |

(Continued)

OTHER PUBLICATIONS

International Search Report for corresponding PCT application PCT/JP2007/056620.
Japanese language office action and its English language translation for corresponding Japanese application 2006087095.

(Continued)

*Primary Examiner* — Kenny Lin
(74) *Attorney, Agent, or Firm* — DLA Piper LLP (US)

(57) ABSTRACT

A base station device of the present invention includes a base-station main body connected to a network, and multiple antenna units connected in series to the base-station main body. The base-station main body multiplexes signals acquired from the network and outputs the multiplexed signals to an antenna unit. The antenna unit demultiplexes the multiplexed signals into a signal to be transmitted by the antenna unit and another signals to be transmitted by another antenna unit, and transmits the other signal to the other antenna unit. The antenna unit multiplexes a signal received by the antenna unit and a signal received by the other antenna unit, and outputs the multiplexed signals to the base-station main body. The base-station main body demultiplexes the multiplexed signals, and transmits the demultiplexed signals to the network. Each antenna unit includes a demultiplexer of a single-input and three-outputs and a multiplexer of three-inputs and a single-output.

3 Claims, 3 Drawing Sheets

FOREIGN PATENT DOCUMENTS

| | | |
|---|---|---|
| JP | 2001320348 A | 11/2001 |
| JP | 2002111579 A | 4/2002 |
| JP | 2004247824 A | 9/2004 |
| JP | 2005252996 A | 9/2005 |
| JP | 2005323076 A | 11/2005 |

OTHER PUBLICATIONS

Japanese language office action and its English language office action for corresponding Japanese application 2006087095.

* cited by examiner

BASE STATION DEVICE AND SIGNAL PROCESSING METHOD

CROSS-REFERENCE TO RELATED APPLICATIONS

This application is a national stage of international application No. PCT/JP2007/056620, filed on Mar. 28, 2007, and claims the benefit of priority under 35 USC 119 of Japanese Patent Application No. 2006-087095, filed on Mar. 28, 2006, which are incorporated herein by reference.

The present invention relates to a base station device and a signal processing method that can easily extend a wireless communication area.

BACKGROUND ART

With the popularization of mobile communication devices such as cellular phones, an increasing number of base stations that execute wireless communication with mobile terminals are established. The position of base stations to be established and the sizes of communication areas need to be designed to establish the base stations so that the available communication ranges and the number of established base stations are optimized. On the other hand, one wireless base station in the current situation includes a main body thereof and about four antenna units connected to the main body. As a result, an additional base station has to be established in units of one main body and four antenna units to enlarge a communication area, causing an increase in establishment cost. Particularly, a base-station main body cannot always be established easily at a position where antenna units should be established, making it difficult to optimize available communication ranges (communication areas) and the number of established base stations.

A base station network for mobile communication disclosed in Patent Document 1 is known as a prior art of a technique using an optical cable to connect base stations to each other.

Patent Document 1: Japanese Patent, Unexamined Application, Publication No. 2001-320348

DISCLOSURE OF THE INVENTION

Problems to be Solved by the Invention

To solve the problems, antenna units can be flexibly established if it is possible to separate an antenna unit from a base-station main body and to establish the antenna unit at a position apart from the base-station main body.

However, the base-station main body and the antenna unit have to be connected to each other using a communication cable. As a result, the same number of communication cables as that of the antenna units connected to the base-station main body have to be wired from the base-station main body to the antenna units, causing an increase in wiring cost. If only an antenna unit is additionally established, reconstruction of the base-station main body as well as wiring between the base-station main body and the antenna unit are required, making it difficult to enlarge a communication area.

The present invention is made in view of the above circumstances, and it is an object thereof to provide a base station device and a signal processing method that can easily extend a wireless communication area.

Means for Solving the Problems

One aspect of the present invention is a base station device comprising a base-station main body connected to a network and multiple antenna units connected in series to the base-station main body. Each of the antenna units includes: a wireless communication unit that includes an antenna for wirelessly transmitting and receiving a signal to and from a mobile terminal; a reception-signal multiplexing unit that multiplexes a reception signal received by another antenna unit and a reception signal received by the wireless communication unit, and outputs the multiplexed reception signals to the base-station main body; and a transmission-signal demultiplexing unit that separates a transmission signal to be transmitted by the wireless communication unit from among multiplexed transmission signals input from the base-station main body, and outputs a transmission signal to be transmitted from the other antenna unit thereto. The base-station main body includes: a reception-signal demultiplexing unit that demultiplexes the multiplexed reception signals into reception signals received by wireless communication units of the antenna units; and a transmission-signal multiplexing unit that multiplexes transmission signals output from the network and to be transmitted from the antenna units and outputs the multiplexed transmission signals to the antenna units.

Preferably, in the base station device of the present invention, optical fiber cables connect the base-station main body to the antenna units, and the antenna units to one another, and the multiplexing unit and the demultiplexing unit execute multiplexing and demultiplexing using an optical-wavelength division multiplex.

Another aspect of the present invention is a signal processing method for a base station device comprising a base-station main body connected to a network and multiple antenna units connected in series to the base-station main body and each including an antenna for wirelessly transmitting and receiving a signal to and from a mobile terminal. The signal processing method includes: a reception-signal, multiplexing step of multiplexing, in each of the antenna units, a reception signal received by another antenna unit and a reception signal received by the wireless communication unit and outputting the multiplexed reception signals to the base-station main body; a reception-signal demultiplexing step of demultiplexing the multiplexed reception signals into reception signals received by wireless communication units of the antenna units; a transmission-signal multiplexing step of multiplexing, in the base-station main body, transmission signals output from the network and to be transmitted from the antenna units and outputting the multiplexed transmission signals to the antenna units; and a transmission-signal demultiplexing step of separating, in each of the antenna units, a transmission signal to be transmitted by the wireless communication unit from among the multiplexed transmission signals input from the base-station main body and outputting a transmission signal to be transmitted from another antenna unit thereto.

Effects of the Invention

According to the present invention, signals to be transmitted to and received from multiple antenna units connected in series are multiplexed, and then transmitted thereto and received therefrom. Thereby, communication cables for connecting the base-station main body and each antenna unit can be connected in series. Further, a new antenna unit to be connected to the base-station main body can be additionally established only by connecting the new antenna unit and already existing antenna units. Therefore, an effect of easily enlarging a communication area can be achieved.

Figure 1:
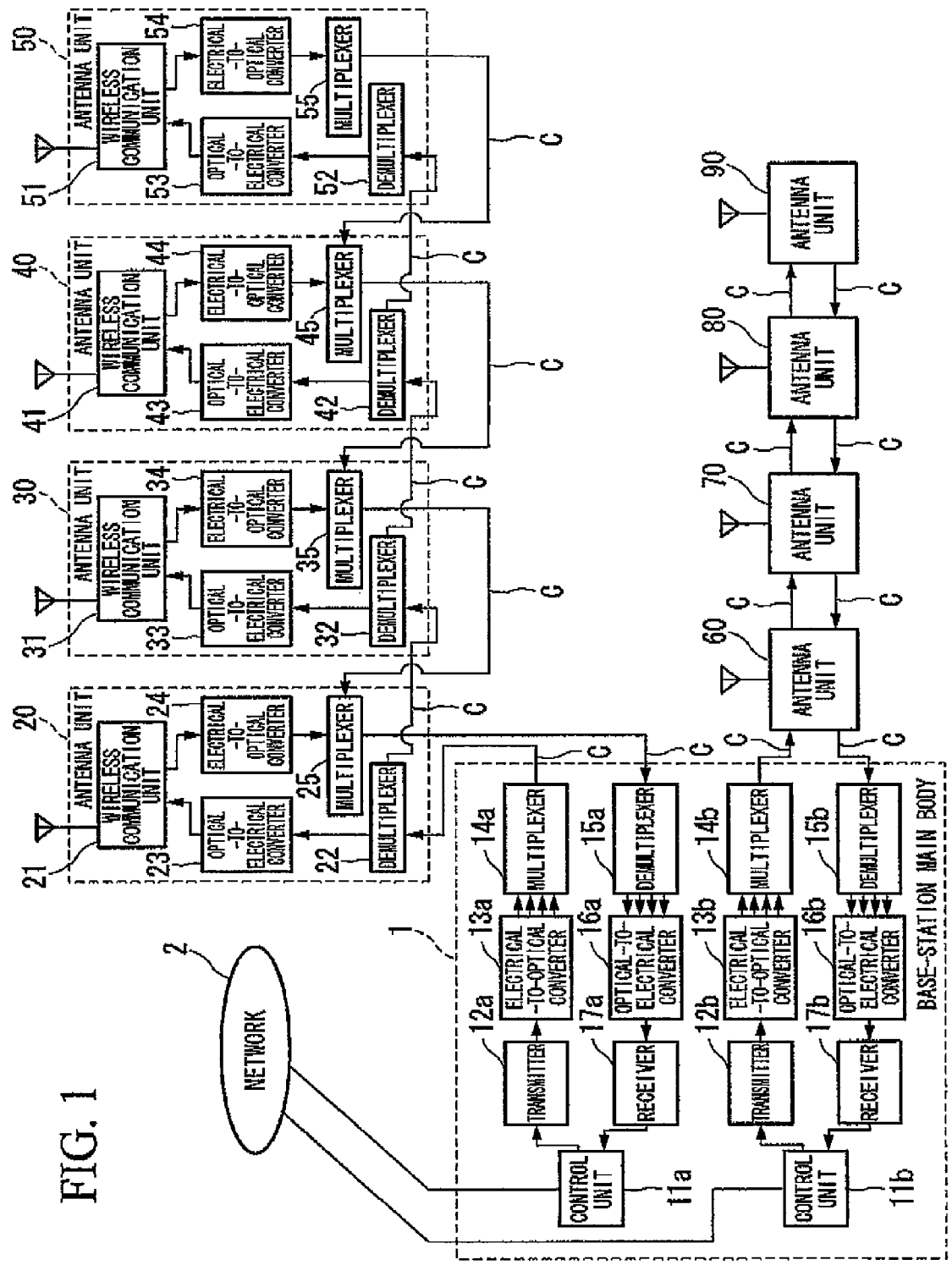
FIG. 1 is a block diagram showing a configuration according to one embodiment of the present invention.
Figure 2:
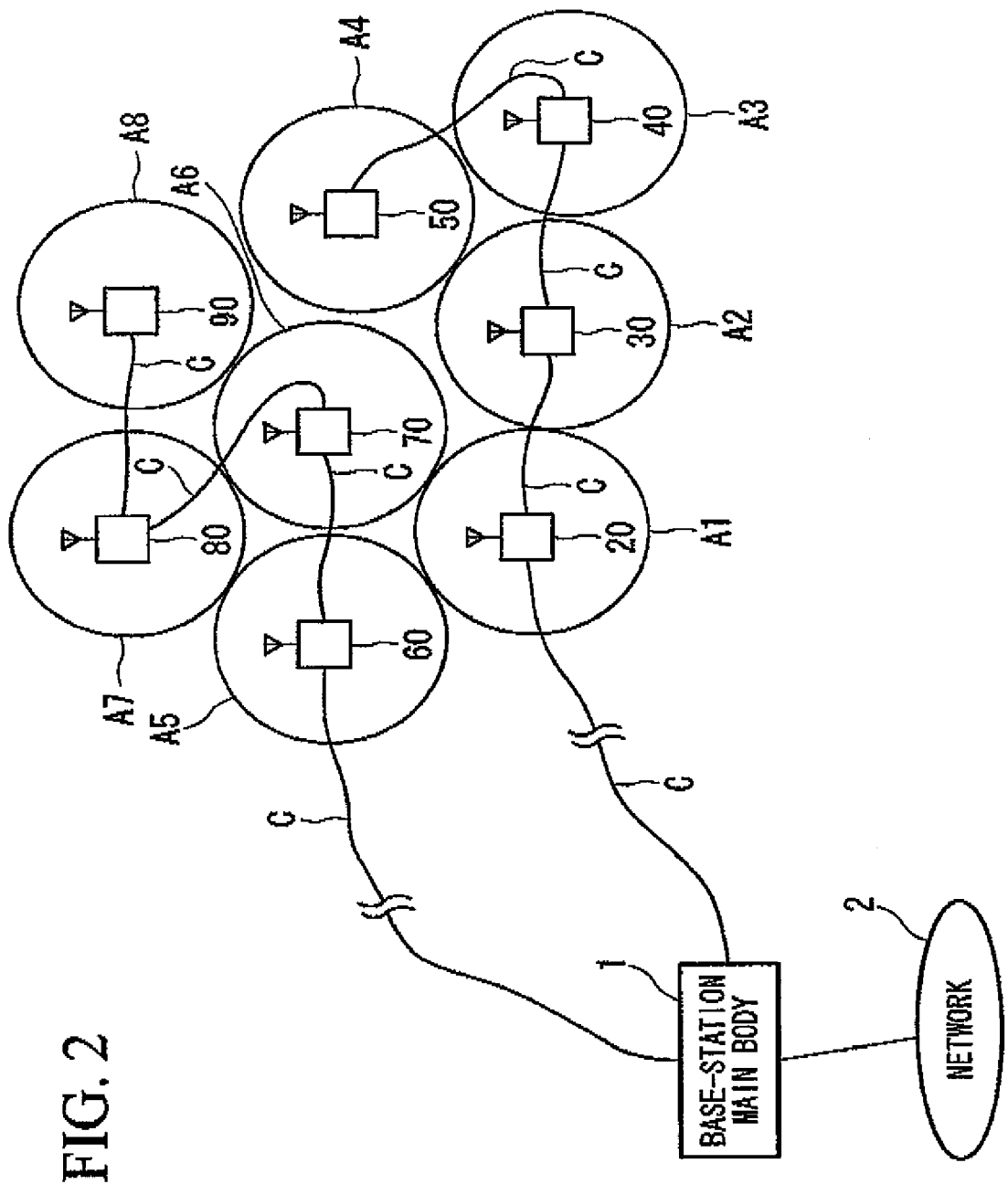
FIG. 2 is an explanatory view showing a disposition condition of communication areas of antenna units shown in FIG. 1.

DESCRIPTIONS OF REFERENCE SYMBOLS 1 base-station main body
11a and 11b controller
12a and 12b transmitted
11a and 13b electrical-to-optical converter
14a and 14b multiplexer
15a, and 15b demultiplexer
16a and 16b optical-to-electrical converter
17a and 17b receiver
2 network
20, 30, 40, 50, 60, 70, 80, and 90 antenna unit
21, 31, 41, and 51 wireless communication unit
22, 32, 42, and 52 demultiplexer
23, 33, 43, and 53 optical-to-electrical converter
24, 34, 44, and 54 electrical-to-optical converter
25, 35, 45, and 55 multiplexer
C optical fiber cable

BEST MODE FOR CARRYING OUT THE INVENTION

Hereinafter, a base station device according to an embodiment of the present invention is explained with reference to the accompanying drawings.

FIG. 1 is a block diagram showing a configuration of the embodiment. As shown in FIG. 1, a base-station main body 1 is connected to a network 2, and executes information communication with a mobile terminal (not shown) through antenna units 20, 30, 40, and 50 via the network 2. The antenna unit 20 is connected to the base-station main body 1. The antenna units 30, 40, and 50 are connected in series to the antenna unit 20. Communication lines between the base-station main body 1 and the antenna unit 20 and among the antenna units 20, 30, 40, and 50 are optical fiber cables C.

In the base-station main body 1, a controller 11a controls the entire operation of the base station device. A transmitter 12a is connected to the controller 11a and transmits information to be transmitted from four antenna units 20, 30, 40, and 50 to mobile terminals within communication areas. An electrical-to-optical converter 13a converts a transmission signal output from the transmitter 12a into an optical signal (converts an electric signal into an optical signal), and outputs the optical signal. A multiplexer (transmission-signal multiplexing unit) 14a multiplexes optical signals output from the electrical-to-optical converter 13a. The multiplexer 14a multiplexes the same number of optical signals as that of the antenna units connected in series to the base-station main body 1, and transmits the multiplexed optical signals to the antenna unit 20 using an optical fiber cable C.

A demultiplexer (reception-signal demultiplexing unit) 15a demultiplexes an optical signal received from the antenna unit 20 into the same number of optical signals as that of the antenna units connected in series to the base-station main body 1. An optical-to-electrical converter 16a converts the optical signals demultiplexed by the demultiplexer 15a into electrical signals. A receiver 17a receives information from mobile terminals within communication areas and received by four corresponding antenna units 20, 30, 40, and 50.

In the antenna unit 20, a wireless communication unit 21 includes an antenna for wirelessly transmitting and receiving a signal to and from a mobile terminal. A demultiplexer (transmission-signal demultiplexing unit) 22 separates (demultiplexes) an optical signal to be transmitted by the wireless communication unit 21 from among the multiplexed optical signals transmitted from the base-station main body 1, and transmits optical signals to be transmitted by other antenna units thereto. An optical-to-electrical converter 23 converts the optical signal separated by the demultiplexer 22 into an electrical signal to be output to the wireless communication unit 21. An electrical-to-optical converter 24 converts an electrical signal received by the wireless communication unit 21 into an optical signal. A multiplexer (reception-signal multiplexing unit) 25 multiplexes optical signals received by the other antenna units and the optical signal received by the wireless communication unit 21, and outputs the multiplexed optical signals to the base-station main body 1.

Similarly, in the antenna unit 30, a wireless communication unit 31 includes an antenna for wirelessly transmitting and receiving a signal to and from a mobile terminal. A demultiplexer (transmission-signal demultiplexing unit) 32 separates (demultiplexes) an optical signal to be transmitted by the wireless communication unit 31 from among the optical signals transmitted from the antenna unit 20, and transmits optical signals to be transmitted by other antenna units thereto. An optical-to-electrical converter 33 converts the optical signal separated by the demultiplexer 32 into art electrical signal to be output to the wireless communication unit 31. An electrical-to-optical converter 34 converts an electrical signal received by the wireless communication unit 31 into an optical signal. A multiplexer (reception-signal multiplexing unit) 35 multiplexes optical signals received by the other antenna units and the optical signal received by the wireless communication unit 31, and outputs the multiplexed optical signals to the antenna unit 20.

Similarly, the antenna unit 40 includes a wireless communication unit 41, a demultiplexer 42, an optical-to-electrical converter 43, an electrical-to-optical converter 44, and a multiplexer 45. The demultiplexer (transmission-signal demultiplexing unit 42 separates (demultiplexes) an optical signal to be transmitted by the wireless communication unit 41 from among the optical signals transmitted from the antenna unit 30, and transmits optical signals to be transmitted by other antenna units thereto. The multiplexer (reception-signal multiplexing unit) 45 multiplexes optical signals received by the other antennas and an optical signal received by the wireless communication unit 41, and outputs the multiplexed optical signals to the antenna unit 30.

Similarly, the antenna unit 50 includes a wireless communication unit 51, a demultiplexer 52, an optical-to-electrical converter 53, an electrical-to-optical converter 54, and a multiplexer 55. The demultiplexer 52 separates an optical signal to be transmitted by the wireless communication unit 51 from the optical signals transmitted from the antenna unit 40, and transmits optical signals to be transmitted by other antenna units thereto. Since the antenna unit 50 is an end terminal of the antenna units connected in series, there is no optical signal to be separated. The multiplexer 55 multiplexes optical signals received by the other antenna units and an optical signal received by the wireless communication unit 51, and outputs the multiplexed optical signals to the antenna unit 40. Since the antenna unit 50 is the end terminal of the antenna units connected in series, there is no optical signal to be multiplexed.

The demultiplexer 52 and the multiplexer 55 are provided to transmit and receive an optical signal to and from another antenna unit if the other antenna unit is connected to the antenna unit 50 and therefore the antenna unit 50 is not the end terminal. In other words, the demultiplexer 52 and the multiplexer 55 are provided to additionally establish a new antenna unit without reconstructing the antenna unit 50.

Although the base-station main body 1 shown in FIG. 1 includes another group of a control unit 11b, a transmitter 12b, an electrical-to-optical converter 13b, a multiplexer 14b, a demultiplexer 15b, an optical-to-electrical converter 16b, and a receiver 17b, the configurations thereof are the same as those of the control unit 11a, the transmitter 12; the electrical-to-optical converter 13a, the multiplexer 14; the demultiplexer 15a, the optical-to-electrical converter 16a, and the receiver 17a. Therefore, the detailed explanation thereof is omitted.

Hereinafter, an operation of the base station device is explained. A case where the antenna unit 20 is assigned a wavelength λ1 of an optical signal, the antenna unit 30 is assigned a wavelength λ2, the antenna unit 40 is assigned a wavelength λ3, and the antenna unit 50 is assigned a wavelength λ4 is explained.

Firstly, an operation for the base-station main body 1 to transmit signals to be transmitted from the antenna units 20, 30, 40, and 50 thereto is explained.

The control unit 11a of the base-station main body 1 receives information to be transmitted by the antenna its 20, 30, 40, and 50 from the network 2 and outputs the information to the transmitter 12a. The transmitter 12a converts the information to be transmitted into an electrical signal to be output to the electrical-to-optical converter 13a, and notifies the electrical-to-optical converter 13a of a wavelength of an optical signal to be used by the antenna unit that transmits the information.

The electrical-to-optical converter 13a converts the electrical signal input from the transmitter 12a into an optical signal using the wavelength notified by the transmitter 12a. If the information to be transmitted is information to be transmitted from the antenna unit 20, the electrical signal is converted into an optical signal of the wavelength λ1. The electrical-to-optical converter 13a outputs the converted optical signal to the demultiplexer 22 of the antenna unit 20. If the wavelengths notified by the transmitter 12a are λ2, λ3, and λ4, the electrical signals are converted into optical signals of the notified wavelengths and output to the multiplexer 14a in a similar manner. The multiplexer 14a multiplexes optical signals of wavelengths λ1 to λ4 input from the electrical-to-optical converter 13a and outputs the multiplexed optical signals to the antenna unit 20 through an optical fiber cable C.

The demultiplexer 22 of the antenna unit 20 separates only the optical signal of the wavelength λ1 from among the multiplexed optical signals input from the multiplexer 14a, output the separated optical signal to the optical-to-electrical converter 23, and transmits optical signals of wavelengths other then the wavelength λ1 to the antenna unit 30. The optical-to-electrical converter 23 to which the separated optical signal is input coverts the input optical signal into an electrical signal and outputs the electrical signal to the wireless communication unit 21. Based on the electrical signal, the wireless communication unit 21 transmits the signal to a mobile terminal through the antenna.

On the other hand, the demultiplexer 32 of the antenna unit 30 that has received the optical signals of the wavelengths other than the wavelength λ1 separates only an optical signal of the wavelength λ2, outputs the separated optical signal to the optical-to-electrical converter 33, and transmits other optical signals of wavelengths other than the wavelength λ2 to the antenna unit 40. The optical-to-electrical converter 33 to which the separated optical signal is input converts the input optical signal to an electrical signal and outputs the electrical signal to the wireless communication unit 31. Based on the electrical signal, the wireless communication unit 31 transmits the signal to a mobile terminal through the antenna.

The antenna unit 40 operates similarly to the antenna unit 30, i.e., separates only an optical signal of the wavelength λ3, outputs the separated optical signal to the optical-to-electrical converter 43, and transmits other optical signals of wavelengths other than the wavelength λ3 to the antenna unit 50. Based on the optical signal of the wavelength λ3, the wireless communication unit 41 transmits the signal to a mobile terminal through the antenna.

The antenna unit 50 converts an optical signal of the wavelength 24 into an electrical signal and transmits the electrical signal to a corresponding mobile terminal. In this manner, the antenna units 20, 30, 40, and 50 transmit signals to be transmitted from the corresponding antennas.

Hereinafter, an operation for the antenna units 20, 30, 40, and 50 to transmit signals received thereby to the base-station main body 1 is explained.

In the antenna unit 50, the wireless communication unit 51 that has received a signal outputs the received electrical signal to the electrical-to-optical converter 54. The electrical-to-optical converter 54 converts the electrical signal input from the wireless communication unit 51 into an optical signal of the wavelength λ4 and output the converted optical signal. The multiplexer 55 transmits the optical signal input from the electrical-to-optical converter 54 to the antenna unit 40. Since the antenna unit 50 is the end terminal and there is no optical signal to be multiplexed by the multiplexer 55, the antenna unit 50 transmits the optical signal input from the electrical-to-optical converter 54 as it is to the antenna unit 40.

In the antenna unit 40, the wireless communication unit 41 that has received a signal outputs the received electrical signal to the electrical-to-optical converter 44. The electrical-to-optical converter 44 converts the electrical signal input from the wireless communication unit 41 into an optical signal of the wavelength λ3 and output the converted optical signal. The multiplexer 45 multiplexes the optical signal input from the electrical-to-optical converter 44 and the optical signal transmitted from the antenna unit 50 and outputs the multiplexed optical signals to the antenna unit 30.

The antenna units 30 and 20 operate similarly. As a result, the optical signals of the wavelengths λ1, λ2, λ3, and λ4 are multiplexed by the multiplexer 25 and input to the demultiplexer 15a of the base-station main body 1.

The demultiplexer 15a demultiplexes the input multiplexed optical signals into the optical signals of the wavelengths λ1, λ2, λ3, and λ4 and outputs the demultiplexed optical signals to the optical-to-electrical converter 16a. The optical-to-electrical converter 16a notifies the receiver 17a of the wavelengths of the received optical signals and outputs the electrical signals converted from the optical signals to the receiver 17a. The receiver 17a identifies the antenna units that have received the electrical signals based on the wavelengths notified from the optical-to-electrical converter 16a, restores information from the received electrical signals, and outputs the information to the control unit 11a. The control unit 11a transmits the information to the network 2.

In this manner, signals to be transmitted are multiplexed to be transmitted and received to and from the multiple antenna units connected in series. Thereby, communication cables connecting the base-station main body and each antenna unit can be connected in series. When an antenna unit to be connected to the base-station main body 1 is additionally established, the establishment can be completed only by connecting the new antenna unit and the already existing antenna units, thereby easily achieving enlargement of a communication area.

For example, in a case where the base-station main body 1 and the communication area A1 are separated from each other, each antenna unit 30, 40, and 50 established in communication areas A2, A3, and A4 need not to be connected to the base-station main body 1 using communication cables. Therefore, when the antenna units 30, 40, and 50 axe additionally established in the communication areas A2, A3, and A4, the antenna units 30, 40, and 50 may be sequentially connected in series to the antenna unit 20 in the communication area A1, thereby reducing the wiring cost of communication cables. Further, if communication areas A to A8 are newly established, the new establishment of the base station can be completed only by connecting antenna units 60, 70, 80, and 90 for communication areas A5, A6, A7, and A8 in series and by long wiring between the base-station main body 1 and the antenna unit 60, thereby reducing a new establishment cost of the base station.

Although the number of the antenna units connected in series to the base-station main body 1 is set to be four in the case of FIG. 1, the number of antenna units connectable to the base-station main, body 1 in series is determined based on the number of wavelength bands capable of being wavelength-division-multiplexed by a pair of the converter 13a and the multiplexer 14a and a pair of the demultiplexer 15a and the optical-to-electrical converter 16a. Therefore, the number of antenna units to be connected in series to the base-station main body 1 is determined based on the number of wavelength bands capable of being multiplexed.

Figure 3:
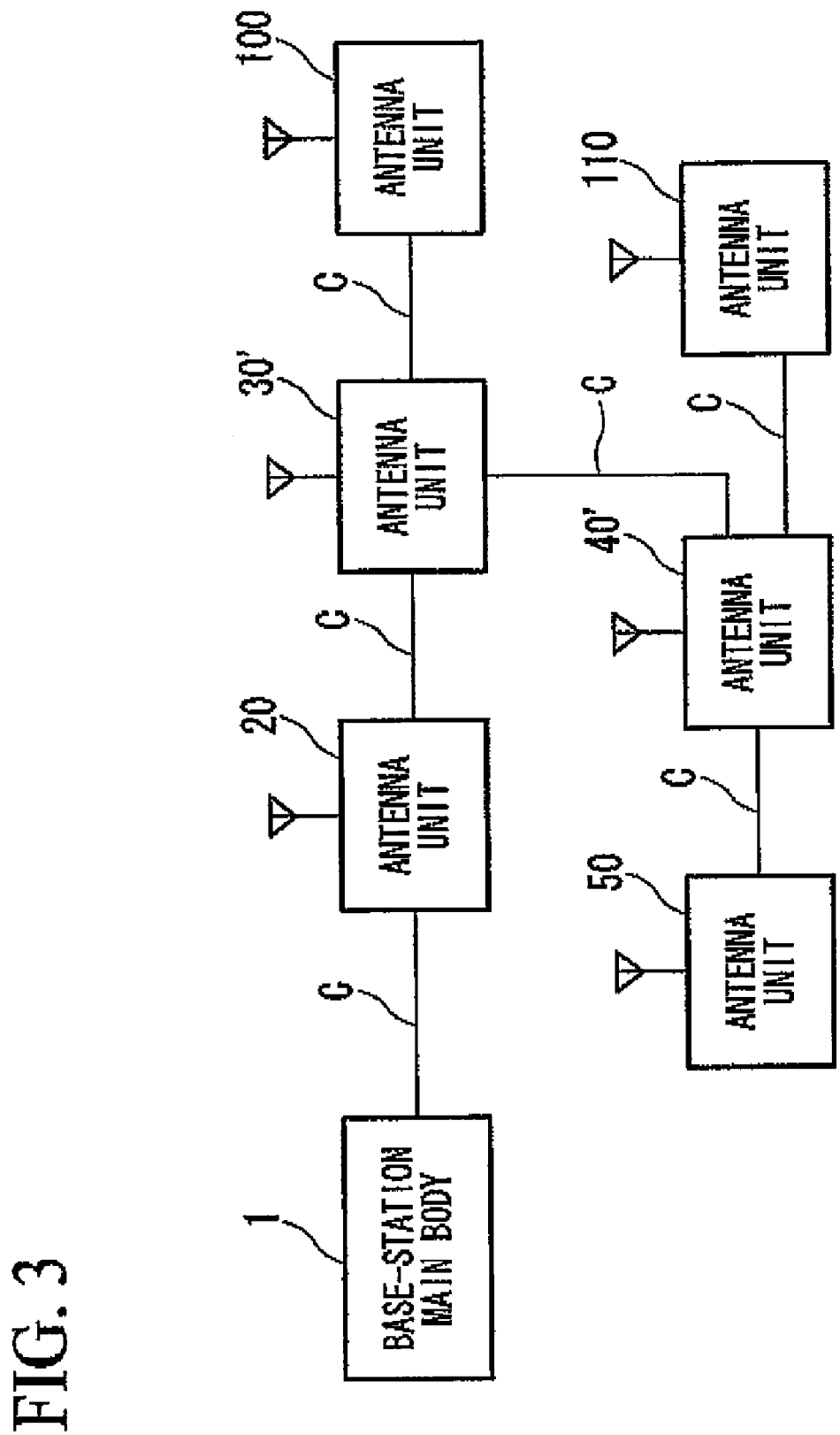
FIG. 3 is an explanatory view showing a modified example of a connection condition of the antenna units shown in FIG. 1.

The case where the antenna unit shown in FIG. 1 uses the demultiplexer of a single-input and two-outputs and the multiplexer of two-inputs and a single-output has been explained above. As shown in FIG. 3, however, if an antenna unit 30' and 40' each using a demultiplexer and a multiplexer of a single-input and three-outputs, the connection shown in FIG. 3 and thereby flexible antenna establishment are enabled.

Although the explanation was given with an example of transmitting and receiving optical signals using the optical-wavelength division multiplex, the transmitting and receiving between the base-station in body 1 and each antenna unit may be executed by multiplexing electrical signals.

The mobile terminal of the present invention includes a cellular phone utilizing a mobile communication system, a personal digital assistance (PDA) having a mobile communication function, a mobile terminal, a car navigation device, and the like.

INDUSTRIAL APPLICABILITY

The present invention is applicable to a base station device for mobile communication such as a cellular phone and a signal processing method for the base station device. According to the present invention, a wireless communication area of the base station device can be easily extended.

The invention claimed is:

1. A base station device comprising a base-station main body connected to a network and a plurality of antenna units connected in series to the base-station main body, wherein optical fiber cables connect the base-station main body to the antenna units, and the antenna units to one another, each of the antenna units comprising:
a wireless communication unit that includes an antenna for wirelessly transmitting and receiving a signal to and from a mobile terminal;
a reception-signal multiplexing unit that multiplexes a reception signal received by another antenna unit and a reception signal received by the wireless communication unit, and outputs the multiplexed reception signals to the base-station main body;
a converter converting an electrical signal into an optical signal and converting the optical signal into an electrical signal; and
a transmission-signal demultiplexing unit that separates a first multiplexed transmission signal input from the base-station main body into a second transmission and a third transmission signal, the second transmission signal to be transmitted by the wireless communication unit from among the first multiplexed transmission signal, and the third transmission signal to be output to the other antenna units and transmitted from the respective wireless communication units of the other antenna units, wherein the converter converts the second transmission signal subsequent to the separation performed by the transmission-signal demultiplexing unit, and
the base-station main body comprising:
a reception-signal demultiplexing unit that demultiplexes the multiplexed reception signals into reception signals received by wireless communication units of the antenna units; and
a transmission-signal multiplexing unit that multiplexes transmission signals output from the network and to be transmitted from the antenna units and outputs the multiplexed transmission signals to the antenna units.

2. The base station device according to claim 1, wherein the transmission-signal multiplexing unit, the transmission-signal demultiplexing unit, and the reception-signal demultiplexing unit execute multiplexing and demultiplexing using an optical-wavelength division multiplex.

3. A signal processing method for a base station device comprising a base-station main body connected to a network and a plurality of antenna units connected in series to the base-station main body and each including an antenna for wirelessly transmitting and receiving a signal to and from a mobile terminal, wherein optical fiber cables connect the base-station main body to the antenna units, and the antenna units to one another, the signal processing method comprising:
a reception-signal multiplexing step of multiplexing, in each of the antenna units, a reception signal received by another antenna unit and a reception signal received by the wireless communication unit and outputting the multiplexed reception signals to the base-station main body;
a reception-signal demultiplexing step of demultiplexing the multiplexed reception signals into reception signals received by wireless communication units of the antenna units;
a transmission-signal multiplexing step of multiplexing, in the base-station main body, transmission signals output from the network and to be transmitted from the antenna units and outputting the multiplexed transmission signals to the antenna units; and
a transmission-signal demultiplexing step of separating, in each of the antenna units, a first multiplexed transmission signal into a second transmission and a third transmission signal, the second transmission signal to be transmitted by the wireless communication unit from among the first multiplexed transmission signal input from the base-station main body,
a converting step of converting, in each of the antenna units, the second transmission signal from an optical signal into an electrical signal subsequent to the transmission-signal demultiplexing step, and outputting the third transmission signal to be transmitted from the respective wireless communication units of the another antenna units.

* * * * *